United States Patent [19]

Sekido et al.

[11] Patent Number: 4,920,591
[45] Date of Patent: May 1, 1990

[54] AIR SUPPORT FOR CHAIR AND METHOD FOR MANUFACTURING CHAIR UTILIZING THE AIR SUPPORT

[76] Inventors: Hiroshi Sekido, 772-48, Nippashi, Tomisato-mura, Inba-gun, Chiba-ken; Toshimichi Hioki, 1037-8, Soinakajima, Motosu-cho, Motosu-gun, Gifu-ken, both of Japan

[21] Appl. No.: 758,800

[22] Filed: Jul. 25, 1985

[51] Int. Cl.$^5$ .............................................. A47C 27/08
[52] U.S. Cl. ........................................ 5/455; 5/457; 297/287
[58] Field of Search ................... 5/455, 457; 297/287, 297/284

[56] References Cited

U.S. PATENT DOCUMENTS

| | | | |
|---|---|---|---|
| 1,156,523 | 10/1915 | Clemens | 5/457 |
| 4,292,702 | 10/1981 | Phillips | 5/457 |
| 4,444,430 | 4/1984 | Yoshida | 297/284 |
| 4,465,158 | 8/1984 | Yamazaki | 297/284 |
| 4,552,402 | 11/1985 | Huber | 5/455 |
| 4,580,837 | 4/1986 | Bayley | 297/284 |

Primary Examiner—Richard E. Chilcot, Jr.
Attorney, Agent, or Firm—Watson, Cole, Grindle & Watson

[57] ABSTRACT

An inflatable support device for use in a chair includes two flexible, generally rectangular outer elements which are sealingly connected along corresponding peripheral edge portions, a plurality of parallel connection elements positioned between and connected to the rectangular outer elements and shaped so as to cause one of the outer elements to have a sinusoidal configuration when the support device is filled with air, and an air port connected to one of the rectangular outer elements.

3 Claims, 14 Drawing Sheets

AIR SUPPORT FOR CHAIR AND METHOD FOR MANUFACTURING CHAIR UTILIZING THE AIR SUPPORT

DETAILED DESCRIPTION OF THE INVENTION

This invention related to an air support for chair, and more particularly an improvement of the air support to be used in an automobile and the improved air support has some devisés in its utilization and manufacturing aspect.

This kind of conventional air support is a mere air bag and it is a major trend to use this air bag into which air is fed or discharged from it to expand or retract the air bag.

Therefore, no air bag was found in which only one air support could fit the body of the user. Even in case that the above-mentioned air support was stored in the seat cushion or seat back, the air support was merely stored in it, so that even if air was poured into the bag, the surface of the seat cushion or seat back merely showed a bulging action, and this type did not fit to the body of the user and so it showed some disadvantages that some effect of holding of the seated person and removing a feeling of fatigue could not sufficiently be attained.

This invention is one in which the above-mentioned disadvantages of the prior art are eliminated for its object.

Referring now to the drawings, some preferred embodiments of the present invention will be described.

BRIEF DESCRIPTION OF THE DRAWINGS

FIGS. 1 to 3 show the first preferred embodiment in which one sheet of suspension fabric is used.

FIGS. 4 to 6 illustrate the second preferred embodiment in which several suspension fabrics are used.

FIGS. 7 and 8 illustrate the third preferred embodiment in which several suspension fabrics are used and their surfaces are made to have corrugated form.

FIGS. 9 and 10 illustrate the fourth preferred embodiment in which several suspension fabrics are used in the same manner as that of FIG. 8 and their surfaces are made to have corrugated form.

FIGS. 11 and 12 illustrate the fifth preferred embodiment in which several suspension fabrics are used to make some independent air chambers.

FIGS. 13 to 15 illustrate an example in which a partial vacant passage is applied for the use of the unit.

FIGS. 16 to 22 illustrate the seventh preferred embodiment in which the tubular suspension fabric is used.

EMBODIMENT

Figure 1:
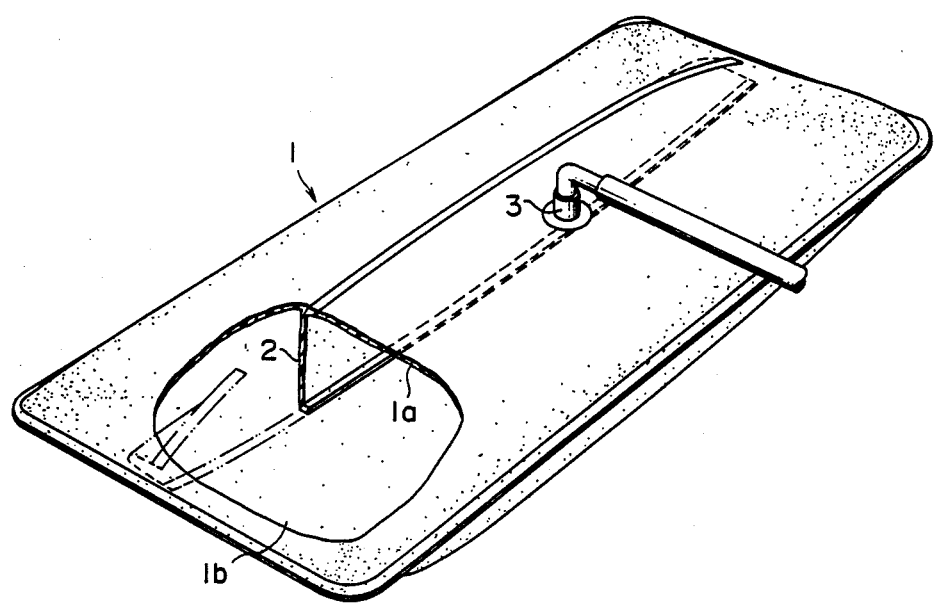
FIGS. 1 to 22 illustrate some examples of the air support for the chair of the present invention.
Figure 2:
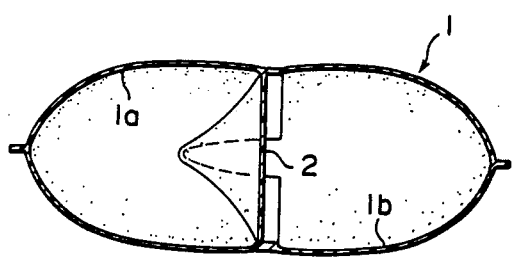

In the first preferred embodiment, it is constructed such that a rectangular suspension fabric (2) is arranged between the upper opposed surface (1a) and the lower opposed surface (1b) in the main body (1) of the air bag and the suspension fabric (2) is applied for making a rectangular cross section when the main body (1) of the air bag is expanded. The main body (1) of the air bag is formed to show a planer rectangular shape by overlaying two sheets of thermoplastic soft urethane resin and thermally heating an entire circumference of the sheets and an air feeding and discharging port (3) to be connected to a pump (not shown) is provided at one of the front and rear surfaces.

Figure 3:
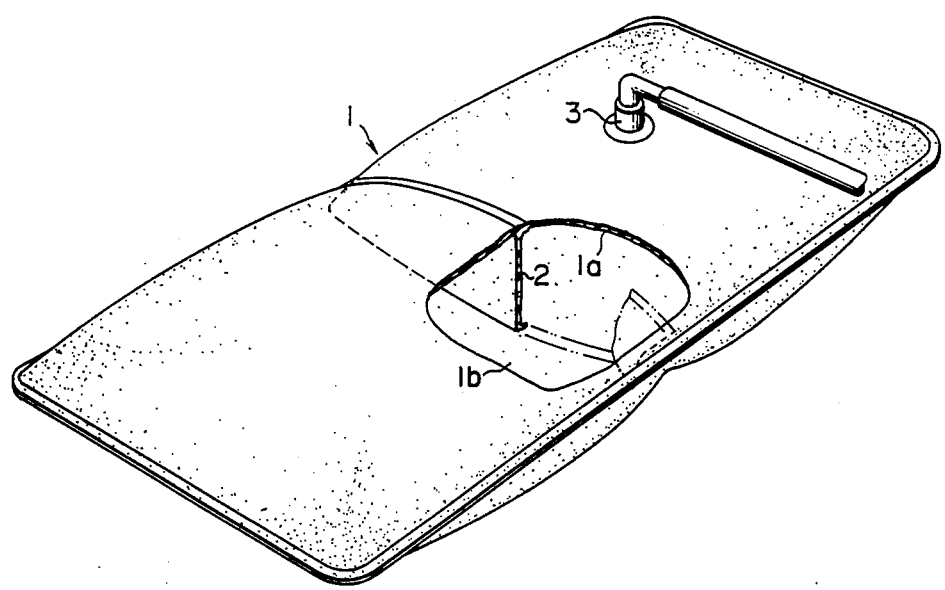

The suspension fabric (2) is of the same material quality as that of the main body (1) of the air bag, and one sheet of fabric is placed on a center line of a longitudinal side in the main body (1) of the air bag as shown in FIG. 1 or one sheet of fabric is placed on the center line of a short side in the main body (1) as shown in FIG. 3, and the upper and lower longitudinal sides are thermally melted to the upper opposed surface (1a) and the lower opposed surface (1b) in the main body (1), respectively. The length of the suspension fabric (2) is slightly shorter than either a longer side or a shorter side of the main body (1) of the air bag, and therefore an air chamber in the amin body (1) is maintained in a unitary form without being partitioned by the suspension fabric (2). The suspension fabric (2) could be used in its tubular form. Further, a more detailed description shows that in order to facilitate a folding of the air bag, the suspension fabric (2) may be made such that two sheets of base fabrics are overlapped to each other and one side part is adhered and they are applied with a permanent line to overlap at their center points. And it may also be possible to overlap two sheets of fabrics, to adhere both sides of the fabrics to form a tubular shape, and the upper and lower central portions are adhered to the upper opposed surface (1a) and the lower opposed surface (1b), respectively.

The air bag of the first preferred embodiment as described above is operated such that when the air is supplied to the main body (1) of the air bag through a feeding and discharging port (3), the main body (1) is expanded while the clearance between the upper opposed surface (1a) and the lower opposed surface (1b) is kept constant by the suspension fabric (2), the cross sectional shape in case of bulged main body (1) is kept as a rectangular form and then the front and rear surfaces of the main body become flat.

Further, in the first preferred embodiment, the suspension fabric is applied as one fabric and a plurality of suspension fabrics, for example, two to three suspension fabrics may also be arranged in parallel. In this way, if a plurality of suspension fabrics are arranged, an effect of holding shape of the main body of the air bag may be increased, the cross sectional shape of the main body can be made more approximate to a rectangular shape and then the surface of the main body can positively be a flat surface.

Figure 4:
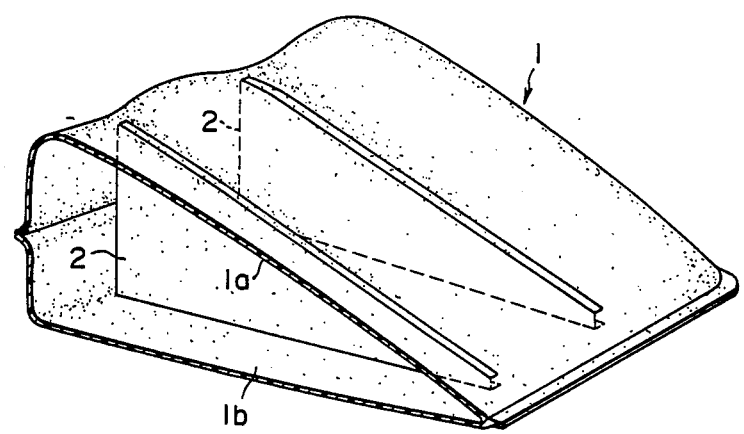
Figure 5:
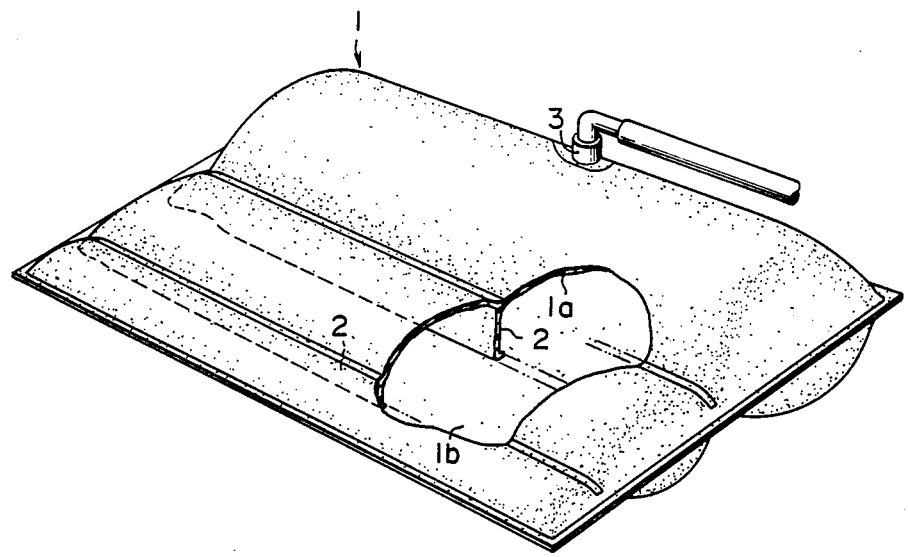
Figure 6:
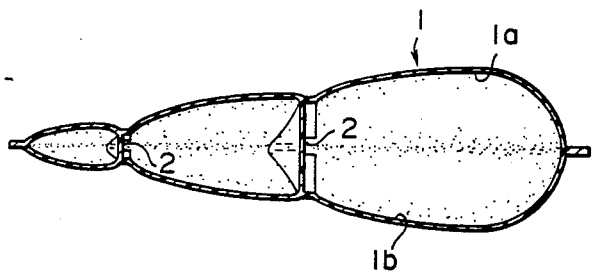

In the second preferred embodiment, as shown in FIG. 4, the suspension fabric (2) arranged at the upper opposed surface (1a) and the lower opposed surface (1b) in the main body (1) of the air bag is formed as a triangular shape or as shown in FIGS. 5 and 6, a plurality of, for example, two rectangular suspension fabrics (2) are arranged so as to divide unevenly the main body (1) in a direction of short side or long side and the height of each of the suspension fabrics (2) is gradually increased in their parallel direction. In case that the triangular suspension fabric (2) is to be installed, the number of fabrics may be either one or a plurality of fabrics. In case that one suspension fabric (2) is applied, the suspension fabric (2) is arranged on the center line of the short side or long side of the main body (1) of the air bag and in case of a plurality of suspension fabrics, it is preferable to arrange each of the suspension fabrics so as to make an equal division of the main body (1) of the air bag in its short side or long side direction in such a way as it may make an effect of holding of uniform shape.

The second preferred embodiment as described above is operated such that when the main body (1) of the air bag is expanded, a clearance between the upper opposed surface (1a) and the lower opposed surface (1b) is gradually increased by the suspension fabric (2) or (2) in its short side or long side direction, the cross sectional shape of the main body (1) of the air bag becomes a triangular shape and then the surface of the main body becomes an inclined or slant surface.

Figure 7:
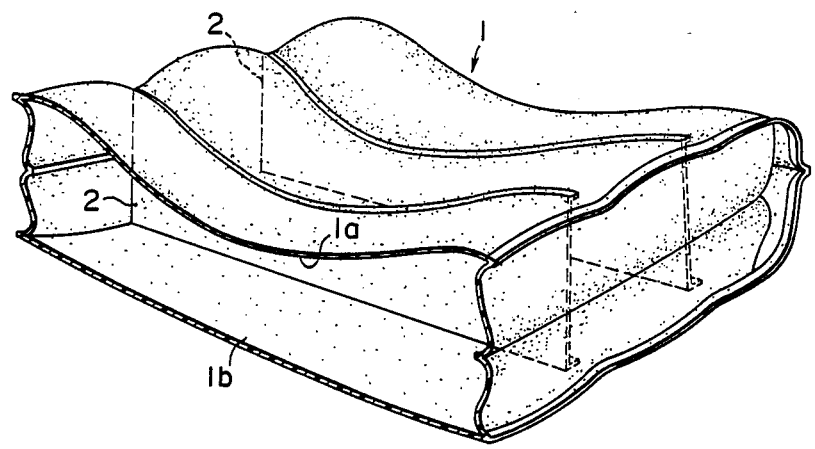
Figure 8:
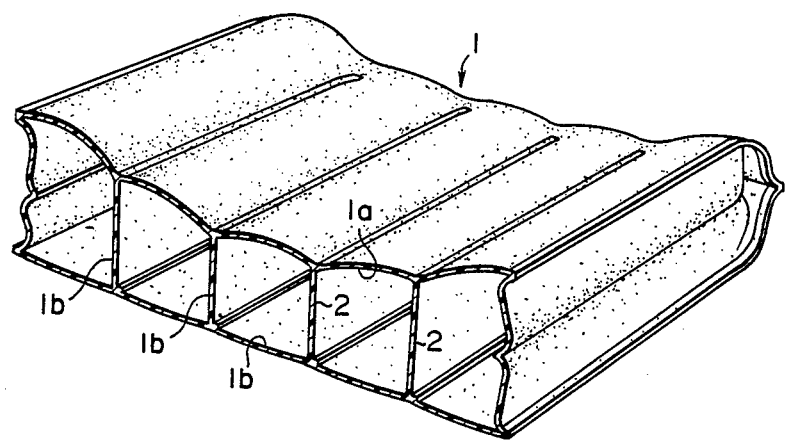

The third preferred embodiment is constructed such that as shown in FIG. 7, the suspension fabric (2) has an arcular side recessed from one rectangular longitudinal side, a plurality of, for example, two suspension fabrics (2) are arranged in parallel in a direction of short side or longitudinal side of the amin body (1) of the air bag, or a plurality of, for example, four rectangular suspension fabrics (2) are arranged in a direction of short side or longitudinal side so as to divide the main body (1) of the air bag as shown in FIG. 8, and the height of each of the suspension fabrics (2) has a higher one at its outer side and a lower one at its inner side, respectively.

The third preferred embodiment as described above is operated such that when the amin body (1) of the air bag is expanded, a clearance between the upper opposed surface (1a) and the lower opposed surface (1b) is varied in a quadratic curve fashion with the suspension fabric (2) or a plurality of suspension fabrics (2), the cross sectional shape of the main body (1) of the air bag becomes such a shape as one rectangular longitudinal side being concaved to an arcular shape, resulting in that the entire surface becomes a concave surface.

Figure 9:
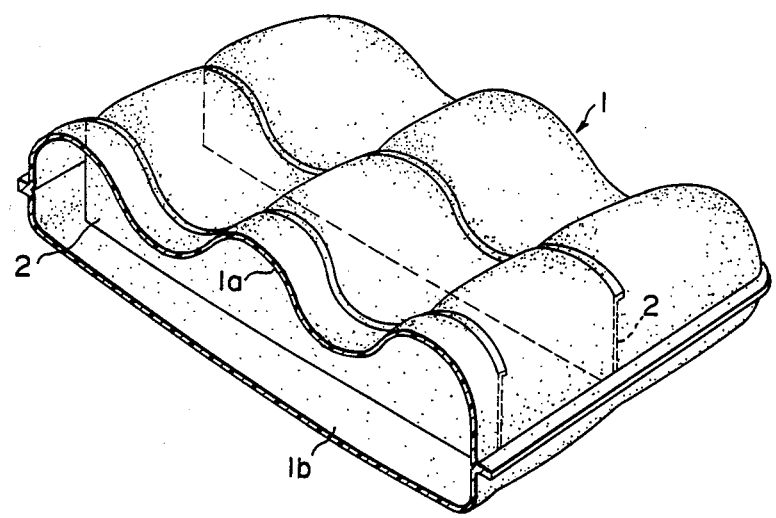
Figure 10:
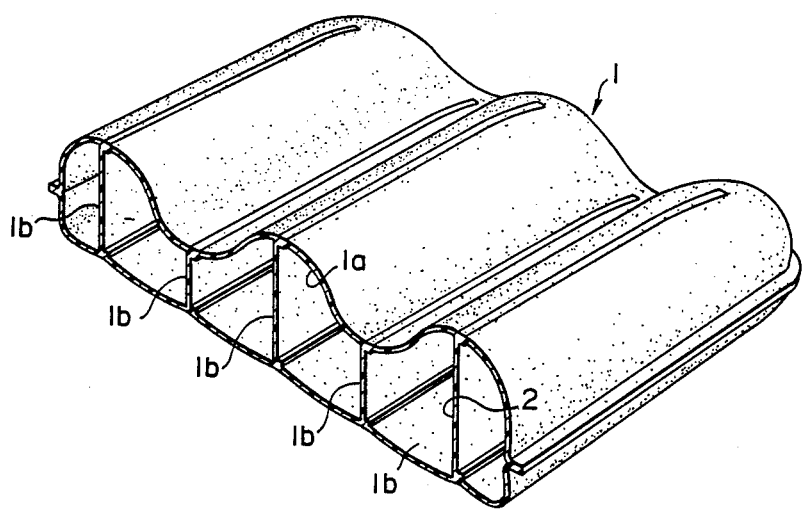

The fourth preferred embodiment is constructed such that as shown in FIG. 9 the suspension fabrics (2) are of such a shape as having longitudinal sides of rectangular shape recessed to show a sine curve, the above-mentioned suspension fabrics (2) are arranged such that a plurality of suspension fabrics, for example, three fabrics are arranged in parallel in a direction of short side or longitudinal side of the main body (1) of the air bag, or as shown in FIG. 10, a plurality of, for example, five rectangular suspension fabrics (2) are arranged in such a way as the main body (1) of the air bag is equally divided in a direction of short side or longitudinal side, the height of each of the suspension fabrics (2) is made higher at its intermediate one and bot outer ones and the suspension fabric held between them is made lower one.

The fourth embodiment as described above is constructed such that when the main body (1) of the air bag is expanded it is held in such a way as a clearance between the upper opposed surface (1a) and the lower opposed surface (1b) is varied in a sine curve fashion with the suspension fabric (2) or a plurality of suspension fabrics (2) and then the cross sectional shape of the amin body (1) of the air bag becomes one in which one rectangular longitudinal side has a sine curved shape and the surface of the main body becomes a curved surface having a raised part and a concave part.

The preferred embodiment of the suspension fabric (2) could be utilized as shown in FIGS. 30 and 31, or FIGS. 32 and 33. With this arrangment, it is possible to facilitate a provision of the corrugated surfaces on the upper opposed surface (1a) and the lower opposed surface (1b), resulting in making a smooth fit to a human body.

Figure 11:
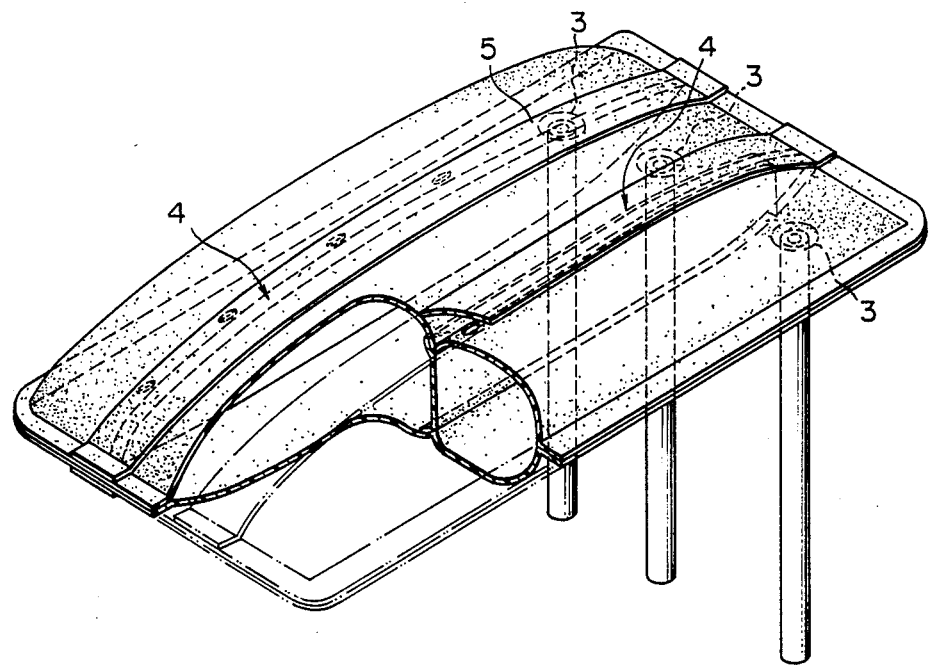
Figure 12:
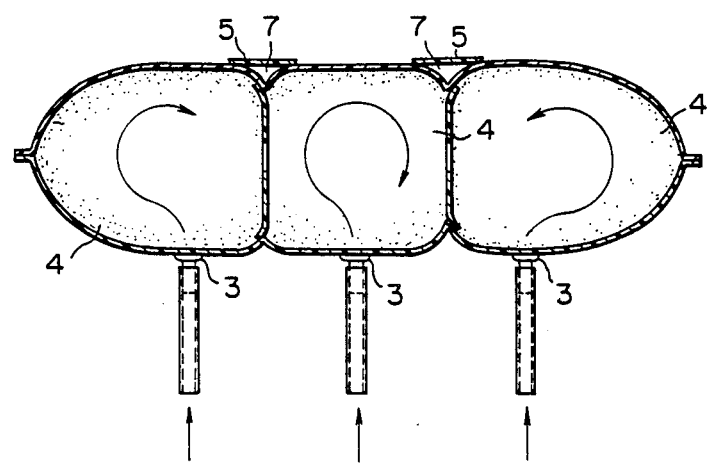

Further, as shown in FIGS. 11 and 12, the main body (1) of the air bag is provided with a rectangular suspension fabric (2) over a clearance between the inner opposed surfaces (1a) and (1b) and further with an air feeding and discharging port (3) to be connected to a pum (not shown) at its rear surface.

The suspension fabrics (2) are of the same material quality as that of the amin body (1) of the air bag, they are arranged in parallel in a properly spaced-apart relation in circumferential direction of the main body (1) and each of the upper and lower edges is welded to the upper opposed surface (1a) and the lower opposed surface (1b) in the main body (1). The length of the suspension fabrics (2) is slightly shorter than the longitudinal side of the main body (1) of the air bag and therefore the air chamber in the main body (1) of the air bag is partitioned by the suspension fabrics (2) to constitute the sub-air chambers (4). The length of the suspension fabrics (2) may correspond to the length of the longitudinal side of the main body (1) of the air bag.

The sub-air chambers (7) are made such that some belt-like sheets (5) cut to the desired width are arranged over the entire length of the above-mentioned thermal melted part and its entire circumferential edges are melted and adhered to the surface of the main body (1).

The above-mentioned belt-like sheets (5) are applied in tension over a space between the portions starting a concave part at both sides of groove-like concave part which is formed along the supporting locations for the suspension fabrics (2) of the surface of the main body, and the width of the abovementioned belt-like sheets (5) and the small sub-air chambers (7) are defined in response to the width of the above-noted groove-like concave portions.

The surface of the main body (1) of the air bag in the small sub-air chambers (7) is provided with some communication holes (6) so as to communicate the interior of the main body (1) with the small sub-air chambers (7).

The main body (1) of the air bag in the above-mentioned preferred embodiment is operated such that when air is supplied through feeding and discharging ports (3) of the inner plugs, the opposed inner surfaces of the main body (1) are expanded with a specified clearance being kept by the suspension fabrics (2), their cross sectional shapes are kept in a rectangular form, sub-air chambers (4) may be independently formed or communicated to each other. In this case, some groove like concave portions are formed along the supports at the edges of the suspension fabrics (2) at the surfaces of the main body (1) of the air bag and the concave portions are hidden by being covered by belt-like sheets (5) by a method wherein the small sub-chambers (7) arranged along the concave poritons are expanded together with the main body (1).

In the above-mentioned preferred embodiment, it is optional that the number of suspension fabrics (2) is decreased down to one suspension fabric or increased upto three to four fabrics and they may be arranged in a direction of the short side of the main body (1) of the air bag, and also in this case the small sub-air chambers (7) are arranged at the supporting parts for each of the suspension fabrics (2) at the surface of the main body (1) of the air bag and thus the surface of the main body (1) is kept flat.

Figure 13:
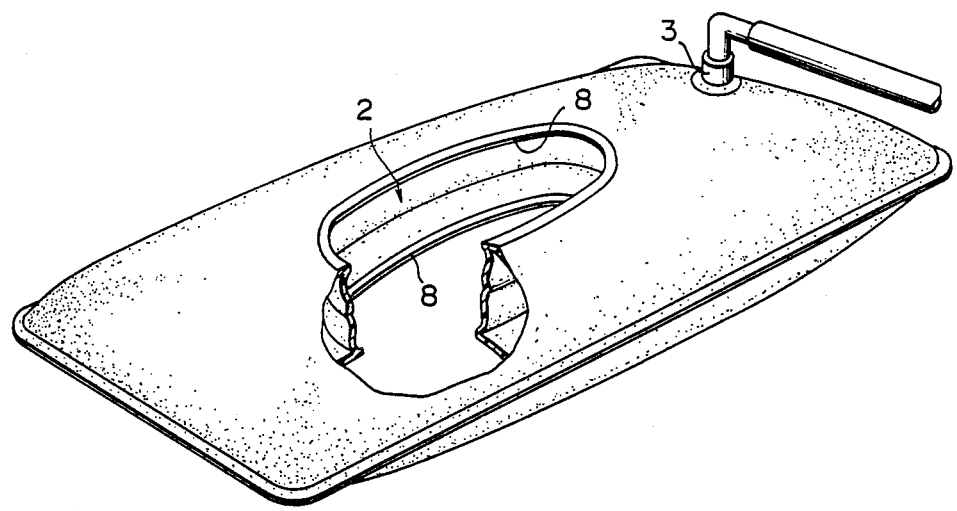
Figure 14:
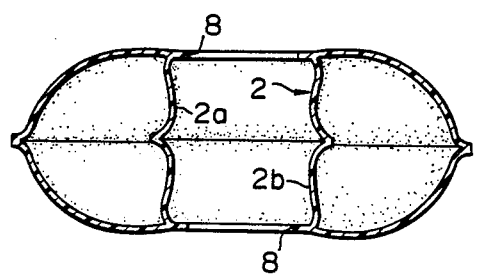

In addition, as shown in FIGS. 13 and 14, each of the upper opposed surface (1a) and the lower opposed surface (1b) of the main body (1) of the air bag is provided with openings (8), and the suspension fabrics (2) are arranged over the circumferential edges of these openings (8).

The main body (1) of the air bag is constructed such that two sheets of thermoplastic soft urethane resin are overlapped to each other and the entire circumferences of the sheets are thermally melted and adhered to each other to form a planer rectangular shape, and one of the sheet surfaces (1a) and (1b) is provided with an air feeding and discharging port (3) to be connected to the pump (not shown).

Each of the openings (8) arranged in the above-noted upper opposed surface (1a) and the lower opposed surface (1b) is of an ellipse or circle having the same diameter, is positioned at the central portions of the upper opposed surface (1a) and the lower opposed surface (1b) and has a relatively large opening area.

The suspension fabrics (2) are of the same material quality as that of the main body (1) of the air bag, two endless belt fabrics (2a) and (2b) are thermally melted and adhered to each other to form a gusset and constructed in such a way as they may be folded, and the upper and the lower circumferential edges are thermally melted and adhered to the circumferential edges of the openings.

Figure 15:
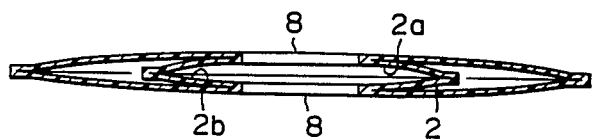

The main body (1) of the air bag of the preferred embodiment as described above is operated such that air is fed from the feeding and discharging port (3) to expand the main body (1), resulting in that a clearance between the circumferential edges of the openings (8) of the upper opposed surface (1a) and the lower opposed surface (1b) on the sheet is uniformly kept by the suspension fabrics (2), the clearance holding action is extened up to the upper opposed surface (1a) and the lower opposed surface (1b) around the openings (8) and then the clearance between the upper opposed surface (1a) and the lower opposed surface (1b) is kept uniform. Under such a condition as the main body (1) of the air bag is expanded, each of the surfaces (1a) and (1b) is flat. In case that the main body (1) of the air bag is retracted, as shown in FIG. 13, the suspension fabrics (2) are folded into the main body (1) of the air bag by their gusset structures. FIG. 15 illustrates the retracted condition of the preferred embodiment shown in FIG. 13.

The preferred embodiment of the present invention will be described in reference to the drawings.

Figure 16:
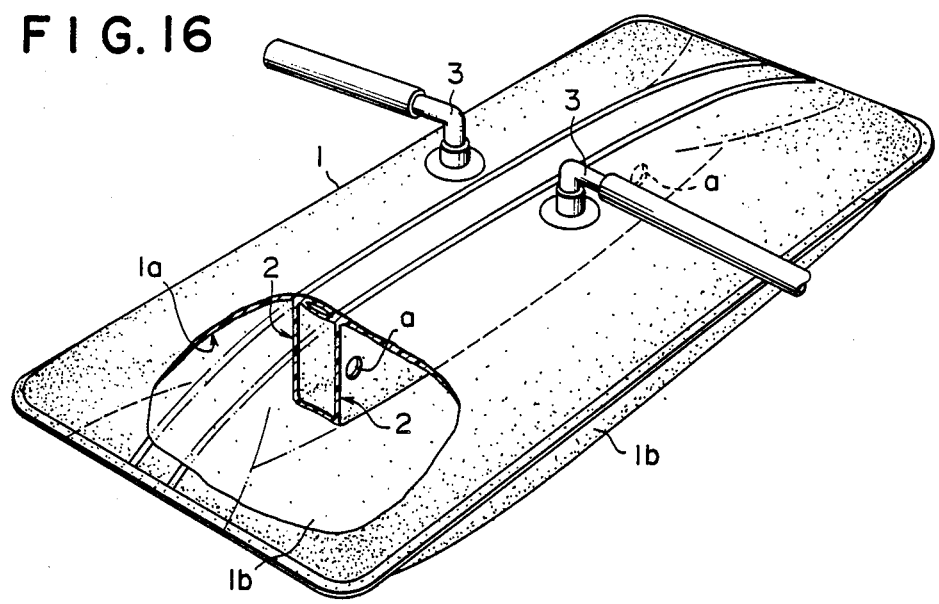

The main body (1) of the air bag is constructed such that as shown in FIG. 16, a tubular suspension fabric (2) is arranged over a clearance between the inner opposed upper surface (1a) and the lower opposed surface (1b).

The main body (1) of the air bag is formed such that transparent front and rear sheets of thermoplastic soft urethane resin are overlapped to each other, then the suspension fabric (2) is thermally melted and adhered to the desired locations at the opposed surfaces of both sheets, thereafter the entire circumferential edges of both sheets are thermally melted and adhered to each other to form a planer rectangular shape.

Figure 17:
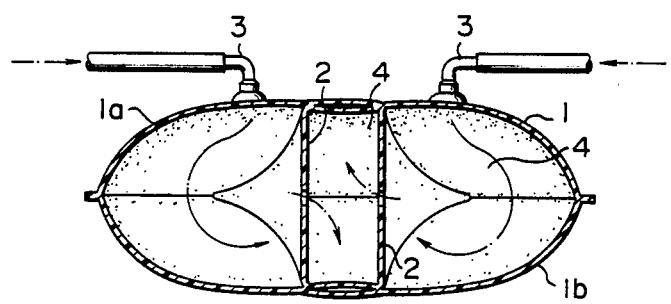

The above-noted suspension fabric (2) is formed to a tubular shape with the same material quality as that of the main body (1) of the air bag, is extended in a direction of longitudinal side at the central part between the upper opposed surface (1a) and the lower opposed surface (1b) of the main body (1) of the air bag, two locations of the upper-most part and the lower-most part acting as the contacted portions between the above-noted opposed surfaces (1a) and (1b) at the circumferential surface of the suspension fabric (2) are thermally melted and adhered with a specified width to the upper opposed surface (1a) and the lower opposed surface (1b) and fixed thereto (FIG. 17).

Figure 18:
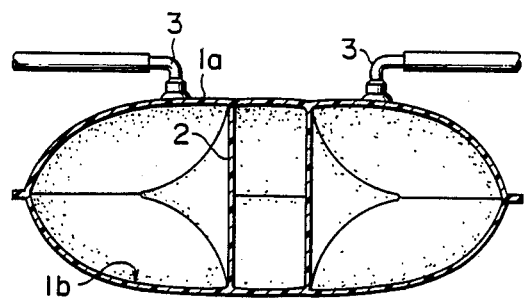

As described above, in order to fix the upper-most part and the lower-most part at the circumferential surface of the suspension fabric (2) to the upper opposed surface (1a) and the lower opposed surface (1b) with a specified width, as shown in FIGS. 16 and 17, two locations at both sides of the fixed width at the circumferential surface of the suspension fabric (2) are thermally melted and adhered in a linear form over the entire length of the suspension fabric (2) or as shown in FIG. 18 the entire surface of the fixed width of the circumferential surface of the suspension fabric (2) is thermally melted and adhered.

A process for thermally melting and adhering the suspension fabric (2) to the upper opposed surface (1a) and the lower opposed surface (1b) in a practical manner will be described in reference to the drawings.

Figure 19:
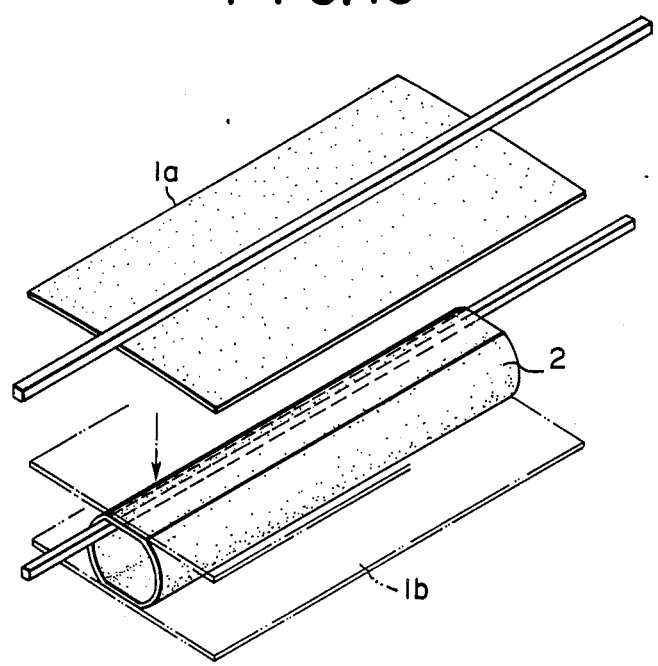
Figure 20:
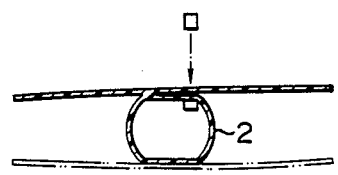
Figure 21:
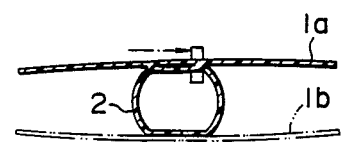

As shown in FIG. 19, the suspension fabric (2) is inserted and fitted to a rod-like lower electrode ($C_1$), a rear sheet (a) is placed on the suspension fabric (2) to set its position, then an upper electrode ($C_2$) is forcedly contacted onto the rear sheet (a) to hold the upper-most part of the suspension fabric (2) and the rear sheet (a) together with the lower electrode ($C_1$), then both electrodes ($C_1$) and ($C_2$) are energized to perform a thermal melting and adhesion. Then, the position where the lower electrode ($C_1$) is applied is displaced by a distance corresponding to the desired fixed width in a circumferential direction of the suspension fabric (2) (FIG. 20), and both the suspension fabric (2) and the rear sheet (a) are held by both electrodes ($C_1$) and ($C_2$), thereafter they are thermally melted and adhered (FIG. 21).

As described above, the suspension fabric (2) and the rear sheet (a) are thermally melted and adhered, thereafter the suspension fabric (2) is rotated by a half distance while it is inserted into the lower electrode ($C_1$), the circumferential surface of the suspension fabric (2) which is just opposite to the fixed part of the suspension fabric (2) thermally melted and adhered as described above is faced upward, the surface part is thermally melted and adhered to the fixed position of the front sheet (b) in the same manner as that of the rear sheet (a), and then the suspension fabric (2) is applied over both sheets (a) and (b).

Since the suspension fabric (2) is of a tubular form, if it is inserted into the rod-like lower electrode ($C_1$), the forcedly contacted surface of the electrode ($C_1$) is held automatically while it is contacted with the inner uppermost surface of the suspension fabric (2), resulting in that an operation for setting the melted and adhered part of the suspension fabric (2) to the lower electrode ($C_1$) and the operation for holding it under such a condition as above may be eliminated and then the rear sheet (a) is fixedly held manually on the suspension fabric (2) held under the above-mentioned condition, held by the upper electrode ($C_2$) and the sheet may be thermally melted and adhered in a simple and easy operation by energizing the upper and lower electrodes ($C_1$) and ($C_2$).

Both front and rear sheets (a) and (b) having the suspension fabric (22) thermally melted and adhered form the planer rectangular main body (1) of the air bag by a thermal melting and adhering of the entire circumferential edges with each other and further a feeding and discharging port (4) is arranged at the rear surface of the main body (1). In this case, both ends of the suspension fabric (2) are held between the sheets (a) and (b) to make an integral thermal melting and adhering.

Figure 22:
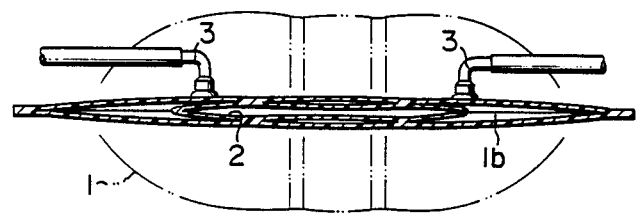

With this arrangement, the suspension fabric (2) is held such that its both ends are collapsed in a direction of shrinkage of the main body (1) of the air bag and the entire suspension bag (2) is collapsed flat. Thus, when the main body (1) of the air bag is shrinked, the suspension fabric (2) is lightly collapsed together with the main body (1) of the air bag and no useless projections are generated at the surface of the main body (1) (FIG. 22).

Both side surfaces (2a) and (2b) holding the upper and lower fixed parts at the circumferential surface of the suspension fabric (2) are tensioned in an expanding direction with a tension force of the main body (1) of the air bag and are deformed to show a rectangular cross section as shown in FIG. 17. Thus, air through-pass holes (9) are made at the circumferential surface of the suspension fabric (2) so as to cause the air in the main body of the air bag to be flowed freely, a deformation of the suspension fabric (2) is freely made and at the same time the small sub-chambers (4) are made independent one.

A permanent folding line is applied in advance at the circumferential folding part in the suspension fabric (2) to cause the suspension fabric (2) to be easily collapsed, the length of the suspension fabric (2) is made slightly shorter than the long side of the main body of the air bag, the air chamber in the main body (1) of the air bag is kept in a unitary form without being partitioned by the suspension fabric (2). In this case, the suspension fabric (2) may not be provided with the through-pass holes (9).

The main body (1) of the air bag in the preferred embodiment as described above is operated such that both side surfaces (2a) and (2b) of the suspension fabric (2) are tensioned in a tensile direction upon feeding of air through the feeding and discharging port (3) and the clearance between the upper opposed surface (1a) and the lower opposed surface (1b) of the main body (1) of the air bag is kept uniformly. At this time, since both side surfaces of the suspension fabric (2) are tensioned with each other with a distance of the fixed width, it may show the same holding effect as that obtained in the case that two suspension fabrics are arranged in parallel with the above-noted distance, the upper opposed surface (1a) and the lower opposed surface (1b) of the main body (1) of the air bag are uniformly held at two points, their cross sectional shapes are held more accurately than that of a piece of suspension fabric, and both front and rear surfaces of the main body (1) of the air bag are formed to an approximate planer flat surface.

It is of course optional that in the above-mentioned preferred embodiment, the number of suspension fabrics is several for example, two to three, these suspension fabrics are arranged side-by-side in a direction of short side of the main body of the air bag. In this way, if a plurality of suspension fabrics are arranged, the effect of holding the shape of the main body of air bag can be improved.

It may be applied that the suspension fabric (2) is of a cross-shape, each of the small sub-air chambers (4) is independently arranged and the through-pass holes (9) are provided at each of the suspension fabrics.

The air support for the chair of the present invention is made with the above-mentioned constitution.

Figure 23:
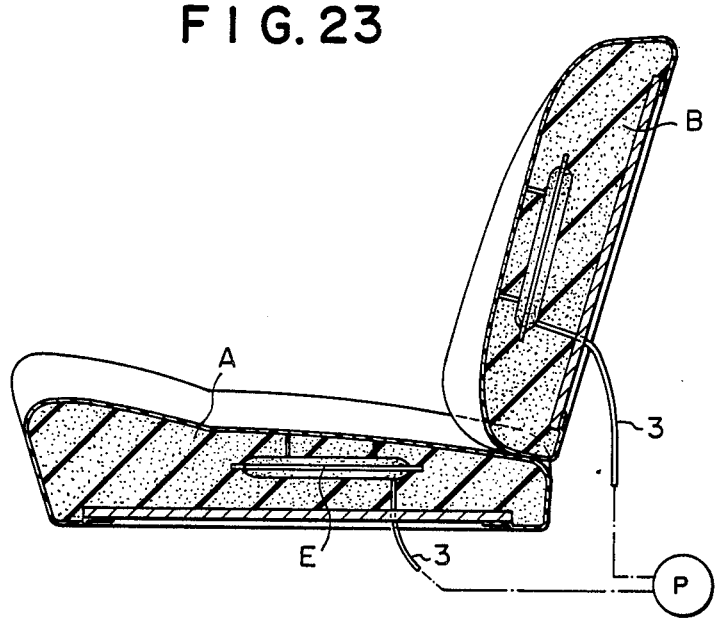
FIGS. 23 to 29 illustrate the method for manufacturing the unit in which the air support for the chair of the present invention is applied in the chair.
Figure 24:
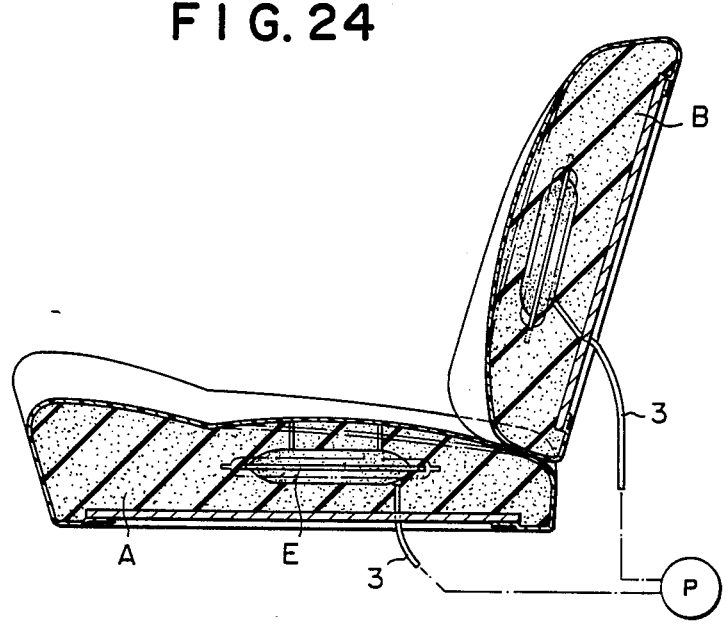

Then, the dependent inventions of the air support for the chair of the present invention will be described, as shown in FIGS. 23 and 24, one or a proper number of air supports for the chair having the air feeding and discharging port (3) to be connected to a pump (not shown) are sealingly enclosed in the seat cushion (A) or the seat-back (B). Under this sealed condition, air is fed from the pump through the feeding and discharging port (3) to cause the seat cushion (A) or the seat-back (B) to be expanded to make a desired feeling of cushioning and if it is not used, the air is extracted to make a normal flat condition.

Figure 25:
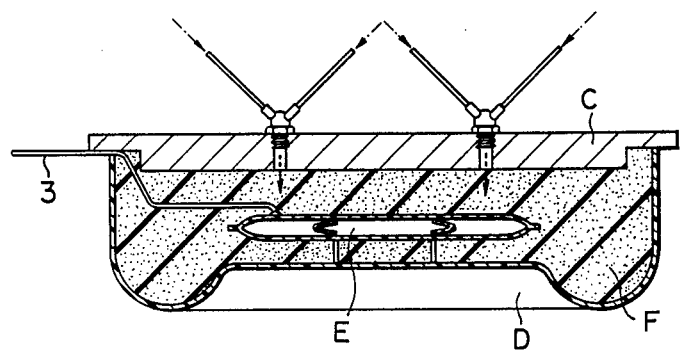
Figure 26:
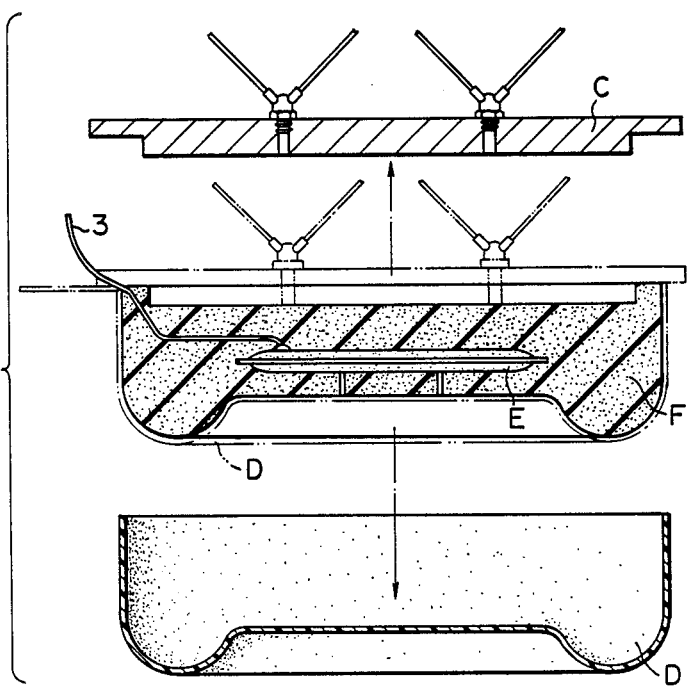
Figure 27:
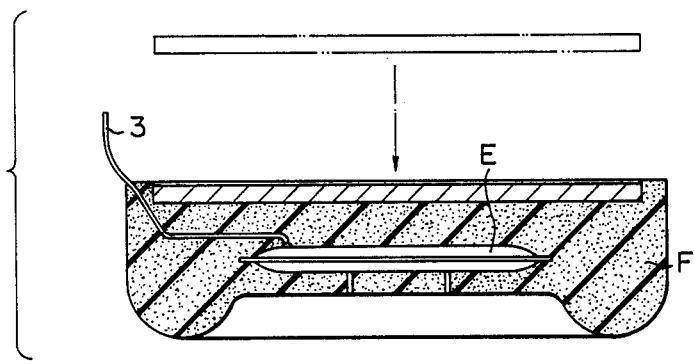

The method for manufacturing the air support for the chair of the present invention will be described, wherein as shown in FIGS. 25 and 26, and FIG. 27, a molding die is formed by the upper mold (C) and the lower mold (D), the air support (E) for the chair is floated at the central parts of the upper mold and the lower mold and stored therein, and the feeding and discharging port (3) for the air support for chair is set out of the molds.

The expandable and retractable foam material (F), for example, urethane under this condition will be described.

1. Compound of urethane

| 1. Compound of urethane | |
|---|---|
| Polyol | 100 |
| Iocyanate | 40 to 50 |
| Zinc oxide: | heat-resistant stabilizer for polyvynil chloride. foaming assistant |
| Water + tertiary amine 3 to 4: | foaming agent |
| Foaming regulating agent of silicon | 1 to 2 |
| Catalyst of tin | 0.2 to 0.4 |

The above-mentioned expandable and retractable foaming material is poured into the mold, an entire circumference of the air support (E) for chair is covered with the prior expandable and retractable foaming material, thereafter foamed and cured to form the air support. Physical quality of the expandable and retractable foaming material is as follows.

| Note | |
|---|---|
| 1. Apparant density (ASTM) | 52.3 Kg/m$^3$ |
| 2. Hardness (JIS 50 m/mt) | Product 69 m/mt |
| Load at a flexing of 25% | 16.8 Kg/314 cm$^2$ |
| Load at a flexing of 65% | 65 Kg/314 cm$^2$ |
| 3. Tensile strength (JIS) | 1.23 Kg/cm$^2$ |
| 4. Rate of elongation (JIS) | 145% |
| 5. Tensile strength (ASTM) | 0.97 Kg/cm$^2$ |
| 6. Repletion resiliency (JIS) | 32.1% |
| 7. Compression residual degree (JIS) | 3.9% |
| 8. Repetitive compression residual degree | 3.4% |

Figure 28:
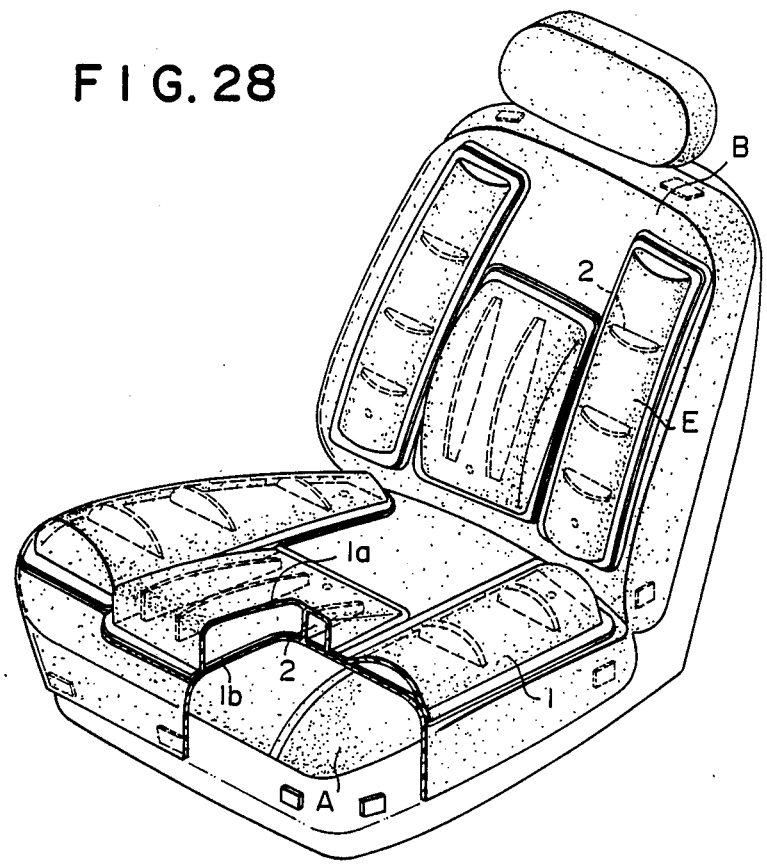
Figure 29:
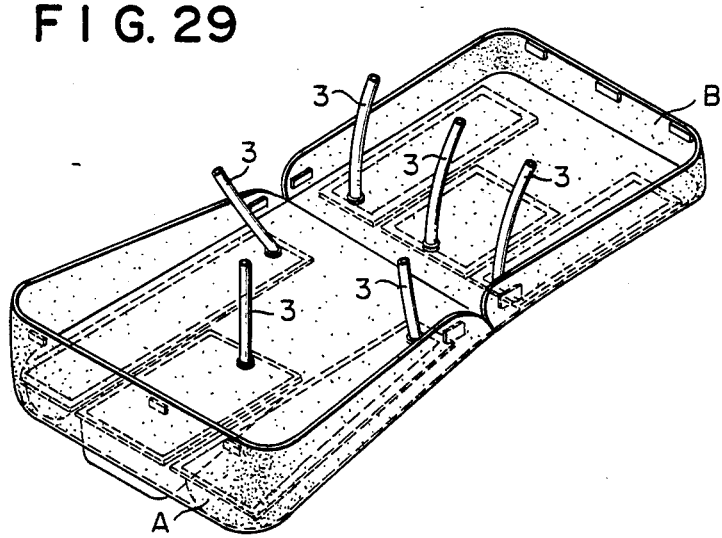
Figure 30:
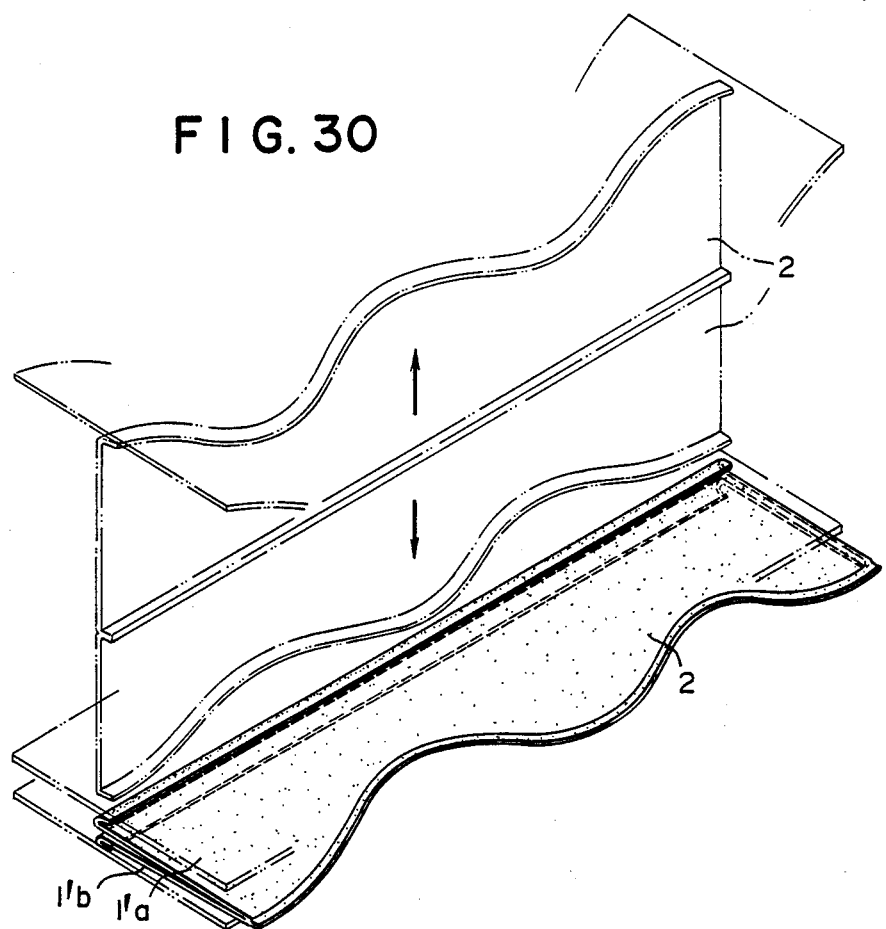
FIGS. 30 to 33 illustrate the special suspension fabric.
Figure 31:
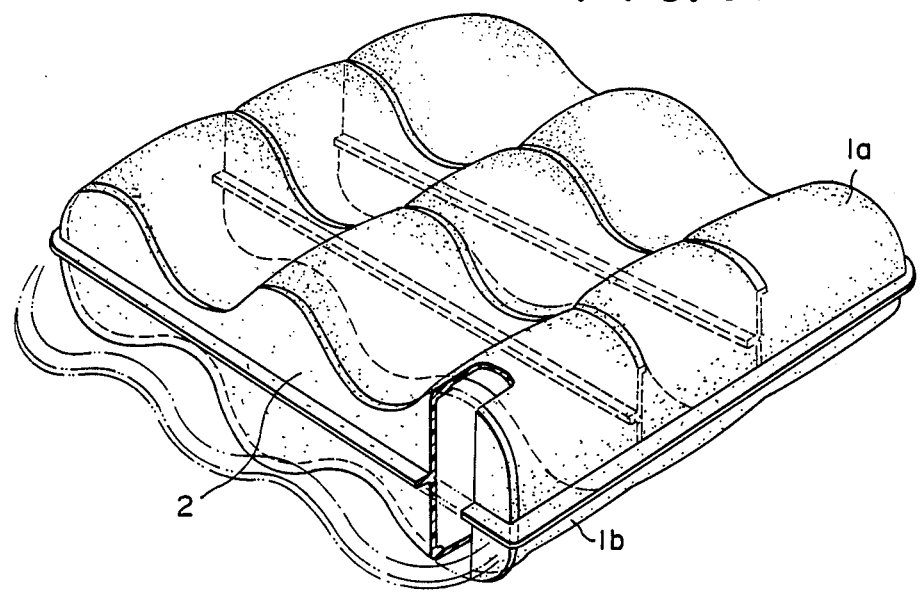
Figure 32:
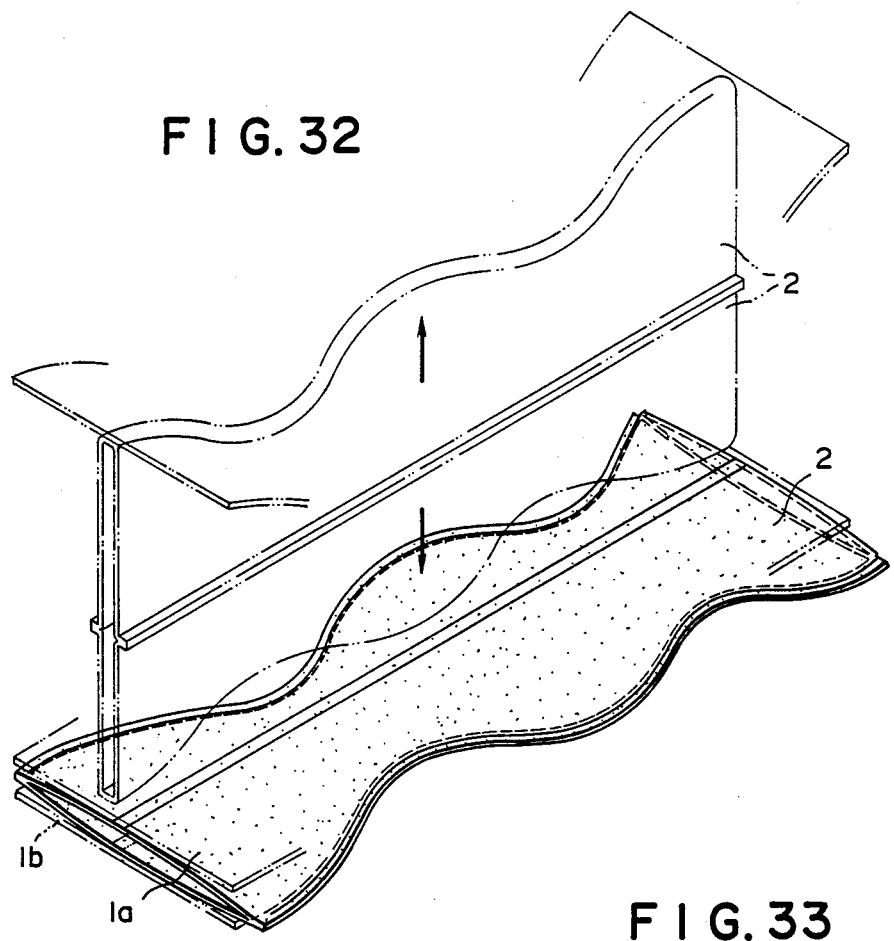
Figure 33:
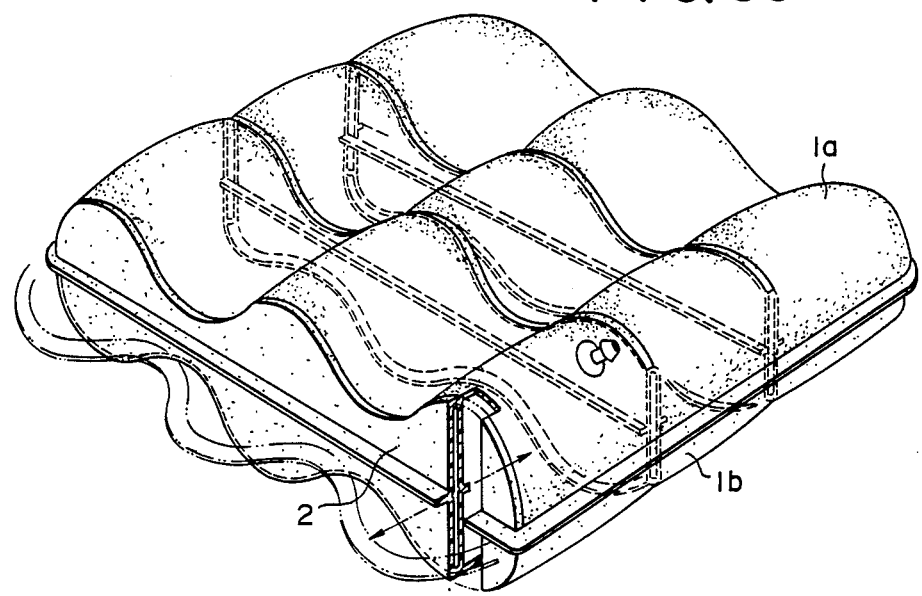

In case that the air support (E) for the chair is independently applied in the seat cushion (A) or seat-back (B) of the seat, as shown in FIGS. 28 and 29, the air support (E) for the chair is placed at a proper location of the seat cushion (A) or the seat-back (B), the pipe part of the air feeding and discharging port (3) is passed through the seat cushion (A) or the seat-back (B) and connected to a pump (not shown) to perform the feeding and discharging of air.

The first effect of the present invention will be described. Since each of the suspension fabrics is arranged, the surface of the chair can form the proper concave part to cause the body of the sitting person to be fit thereto to show an effect of reducing a feeling of fatigue. Since the second invention is constructed to have the air support for the chair enclosed in the seat, it may provide an effect of reducing dropping of the unit and facilitating its manufacturing process.

The third invention shows the concrete method for manufacturing the air support in which the air support for the chair may easily be assembled in the seat and can be used in it.

What is claimed is:

1. An inflatable support means for incorporation in a chair, said inflatable support means comprising a pair of identical, generally rectangular outer elements, each of said pair of generally rectangular outer elements being made of a flexible material having a peripheral edge portion, said pair of generally rectangular outer elements being sealingly connected together along their corresponding peripheral edge portions to provide an air chamber therebetween, and one of said generally rectangular outer elements including means for enabling air to be supplied to or removed from said air chamber, and an elongated internal connection element connecting said pair of generally rectangular outer elements inwardly of their connected peripheral edge portions, said elongated internal connection element having a first side edge connected to one of said pair of generally rectangular outer elements and a second side edge connected to the other of said pair of generally rectangular outer elements, one of said first and second side edges of said elongated internal connection element having a sinusoidal configuration so as to provide a sinusoidal configuration to the generally rectangular outer element to which it is connected when said air chamber is filled with air.

2. An inflatable support means as defined in claim 1, including a plurality of said elongated internal connection elements connected between said pair of generally rectangular outer elements, said plurality of elongated internal connection elements being parallel to one another and having their sinusoidal side edges connected to the same one of said pair of generally rectangular outer elements.

3. An inflatable support means for incorporation in a chair, said inflatable support means comprising a pair of identical, generally rectangular outer elements, each of said pair of generally rectangular outer elements being made of a flexible material having a peripheral edge portion, said pair of generally rectangular outer elements being sealingly connected together along their corresponding peripheral edge portions to provide an air chamber therebetween, and one of said generally rectangular outer elements including means for enabling air to be supplied to or removed from said air chamber, and a plurality of internal connection elements connecting said pair of generally rectangular outer elements inwardly of their connected peripheral edge portions, said plurality of internal connection elements being aligned in parallel and having corresponding first side edges connected to one of said pair of generally rectangular outer elements and corresponding second side edges connected to the other of said pair of generally rectangular outer elements, each of said internal connection elements having a constant width dimension between its first and second side edges, and alternate internal connection elements having a uniform first width dimension and the remaining internal connection elements having a uniform second width dimension which is different from said firs width dimension, such that at least one of said generally rectangular outer elements will have a sinusoidal configuration when said air chamber is filled with air.

* * * * *

UNITED STATES PATENT AND TRADEMARK OFFICE
CERTIFICATE OF CORRECTION

PATENT NO. : 4,920,591

DATED : May 1, 1990

INVENTOR(S) : Hiroshi SEKIDO et al.

It is certified that error appears in the above-identified patent and that said Letters Patent is hereby corrected as shown below:

Title page, the following should be inserted:

[73] Assignee: Okamoto Industries, Inc.
Tokyo, Japan

Signed and Sealed this

Thirtieth Day of July, 1991

Attest:

HARRY F. MANBECK, JR.

*Attesting Officer*  *Commissioner of Patents and Trademarks*